May 11, 1948.　　　　O. A. LOGAN　　　　2,441,428
TRAILER HITCH
Filed March 12, 1946　　　　3 Sheets-Sheet 1

INVENTOR,
Otis A. Logan.
BY Roy E. Hamilton,
Attorney.

May 11, 1948.    O. A. LOGAN    2,441,428
TRAILER HITCH
Filed March 12, 1946    3 Sheets-Sheet 2
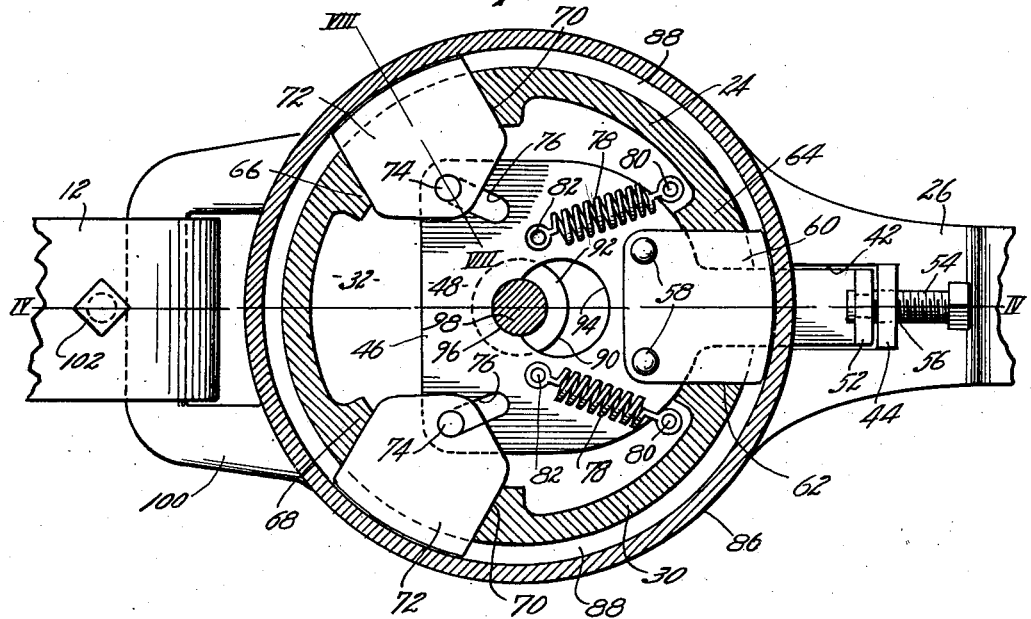
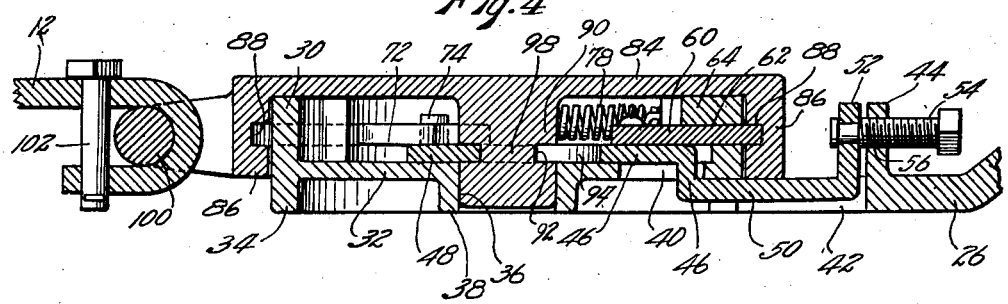
INVENTOR,
Otto A. Logan.
BY Roy E. Hamilton,
Attorney.

May 11, 1948. O. A. LOGAN 2,441,428
TRAILER HITCH
Filed March 12, 1946 3 Sheets-Sheet 3
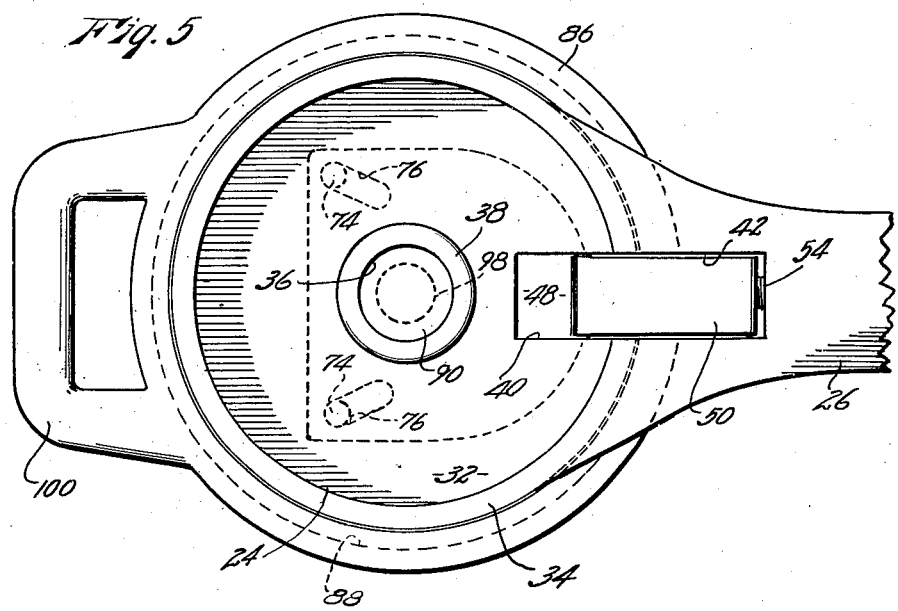
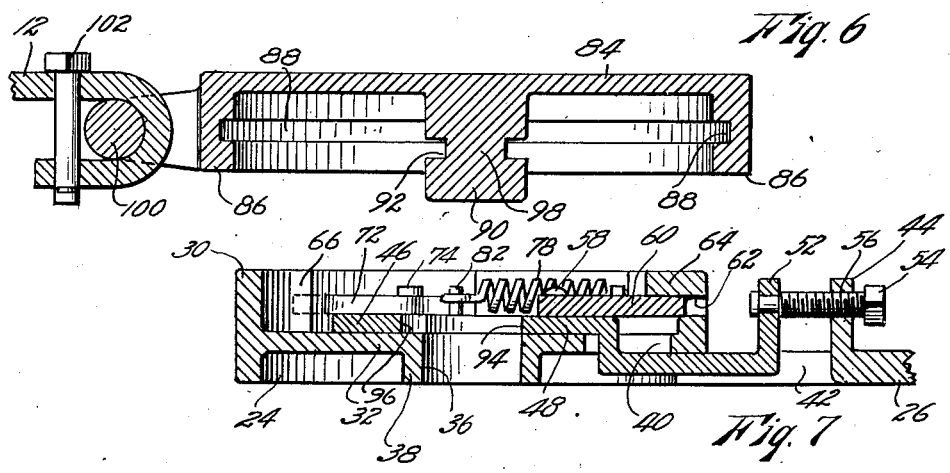
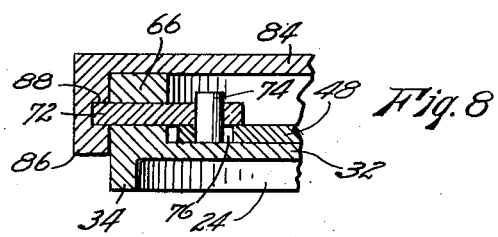
INVENTOR,
Otis A. Logan.
BY
Roy E. Hamilton,
Attorney.

Patented May 11, 1948

2,441,428

UNITED STATES PATENT OFFICE 2,441,428

TRAILER HITCH

Otis A. Logan, Kansas City, Mo.

Application March 12, 1946, Serial No. 653,854

6 Claims. (Cl. 280—33.05A)

This invention relates to improvements in a trailer hitch and has particular reference to a hitch employed to couple together an automobile and trailer.

The principal object of this invention is the provision of a trailer hitch having interconnecting members respectively attached to the automobile and trailer to permit relative rotary movement of said members.

Another object of the invention is the provision of a hitch including an interconnecting member comprising an inverted, dish-shaped plate having an internal annular groove, and an annular member adapted to be fitted into said dish-shaped member and provided with a plurality of movable jaws adapted to be moved to and from engagement in said annular groove whereby the members may be interconnected for relative rotary movement.

Other objects of this invention are sturdiness and simplicity of construction, freedom and safety of operation, and adaptability for use in interconnecting the various types of trailer and power vehicles.

With these objects in view as well as other objects which will appear during the course of the specification, reference will now be had to the drawings wherein:

Figure 1 is a plan view showing a portion of an automobile and a small section of a trailer joined together by a trailer hitch embodying this invention.

Fig. 2 is an enlarged plan view of the interconnecting portion of the hitch with parts broken away to disclose the movable parts.

Fig. 3 is a view similar to that shown in Fig. 2 with the jaws moved to the securing position.

Fig. 4 is a longitudinal sectional view taken on line IV—IV of Fig. 3.

Fig. 5 is an inverted plan view of the parts shown in Fig. 2.

Fig. 6 is a central sectional view of the upper flanged plate.

Fig. 7 is a central sectional view of the jaw carrying circular member.

Fig. 8 is a fragmentary sectional view taken on line VIII—VIII of Fig. 3.

Throughout the several views like reference characters refer to similar parts and the numeral 10 designates the fractional part of a trailer to which is secured a hitch member 12. The numeral 14 indicates a portion of an automobile frame having side rails 16 and a cross tie bar 18. To provide a suitable support for the automobile portion of the hitch, a draw bar 20 is secured to the cross tie bar 18 and is secured in substantially parallel relation with the side rails 16 by means of laterally disposed brace members 22 which are secured at their inner ends adjacent the outer extremity of the draw bar 20 and at their outer ends to the respective side rails 16. The rear end of draw bar 20 extends beyond frame 14 and carries a circular plate member 24 having an arm 26 extending outwardly therefrom which is attached to draw bar 20 by means of rivets 28.

Circular member 24 is provided with an annular flange member 30 which extends above the body 32 and a flange member 34 which extends below body 32. An axially disposed opening 36 passes through base 32 and is lengthened by a flange 38 which extends flush with the outer plane of flange 34. The base 32 is provided with an elongated opening 40. Also, arm 26 is slotted at 42. This slot 42 extends outwardly beyond the periphery of circular member 24, and terminates at the upstanding ear 44 which is integral with 26. A shift plate 46, formed as best shown in Figs. 4 and 5, is provided with a body portion 48 and an elongated neck portion 50. The body portion 48 rests on top of the body 32 of member 24 while the neck portion extends downwardly through elongated slot 40 thence underneath base 32 in slot 42 to terminate in a head or standard 52 which is in alignment with ear 44. An adjusting screw 54 is rotatively mounted in standard 52 and operatively mounted in a threaded hole 56 formed through ear 44, so that as the adjusting screw 54 is rotated the shift plate 46 will be moved.

Fixed to body 48 by means of rivets 58 is a jaw 60 which extends through an opening 62 formed through a thickened section 64 of flange 30. Other thickened portions 66 and 68 of flange 30 are slotted at 70 to receive jaws 72 which are radially adjustable by pins 74 mounted transversely in jaws 72 with their end portions extended into slots 76 formed in the body 48 of the shift plate. It will be noted that jaws 72 and jaw 60 are equally spaced in annular groove 88 of the trailer member 84.

These slots 76 converge toward the central jaw 60 and in like angles to the direction of travel of member 46 so that as the member 46 is adjusted by means of screw 54, jaws 72 will be caused to move radially in slot 70. A pair of tension springs 78 are attached at their one end to pin 80 mounted in the base 32 and at their other end to a pin 82 mounted in the shift plate 46. These springs are so tensioned that they constantly urge jaw 60 to the position shown in Figure 3, thus insuring the proper positioning of the jaws to secure the hitch parts together.

Referring now to the trailer member which comprises an inverted dish-shaped plate 84, having downturned side wall 86, which is provided with an internal annular groove 88, extending axially of the plate 84 is depending cylindrical lug 90, annularly grooved at 92 intermediate its ends. This dish-shaped plate is adapted to be fitted over the outer wall of member 24 with the lug 90 extended through an opening 94 formed through the body 48 of the shift plate and into the opening 36 formed through body 32 of the circular member 34. The main portion of opening 94 is of substantially like diameter as opening 36 and lug 90, and when the parts are in operative relation for assembly, the body 48 of the shift plate is in register with the groove 92 of lug 90 to permit movement of the shift plate body to set the jaws. To permit a further movement of the shift plate an arcuate notch 96 of relatively smaller diameter is formed in the shift plate, as shown, so that when the shift plate is fully set to move the jaws to position, as shown in Fig. 3, the shift plate will closely hug the reduced portion 98 of lug 90 to secure the relatively rotatable parts of the hitch against relative axial movement. This central anchoring of the parts will relieve the jaws of much lateral strain and permit freer relative rotary movement of the parts.

Integral with plate 84 is a stirrup 100 adapted to receive the hitch member 12 which is secured thereto by means of pin 102. When the trailer hitch is in operation the power vehicle and trailer can make all the usual turns, furthermore, the parts are always urged to the interlocking position, thus eliminating the possibility of accidental separation of hitch parts to permit the release of the trailer.

What I claim as new and desire to cover by Letters Patent is:

1. In a trailer hitch assembly, a circular member attached to the frame of an automobile, a plurality of radially movable jaws carried by said member, an inverted dish-shaped plate secured to the trailer and having an internal annular groove and adapted to be fitted over said circular member and to receive said jaws in said internal groove whereby said circular member and plate are secured together for relative rotary movement, and manually operable means to secure said circular member and plate against relative axial movement.

2. In a trailer hitch assembly, a circular member attached to the frame of an automobile, a plurality of radially movable jaws mounted for sliding movement in said member, manually operable means to move said jaws radially to extend a portion thereof beyond the periphery of said circular member, a flanged plate adapted to be secured to a trailer, the flange of said plate having an internal annular groove adapted to receive the extended end portions of said jaws whereby said circular member and plate are secured together for relative rotary movement.

3. In a trailer hitch assembly, a circular member rigidly attached to the frame of an automobile, a plurality of jaws manually operable in a common plane to and from the periphery of said member, an inverted dish-shaped plate having an internal annular groove and adapted to be fitted over said circular member and to receive said jaws in said annular groove whereby the circular members and plate are secured together for relative rotary movement, and resilient means to constantly urge said jaws to the interengaging position in said annular groove.

4. In a trailer hitch assembly, a circular member attached to the frame of an automobile, a shift plate mounted for reciprocal movement in said circular member, a jaw rigidly mounted for movement with said shift plate, jaws slidably mounted in said circular member and operable by cams formed on said shift plate, an inverted dish-shaped trailer plate having an internal annular groove and adapted to be fitted over said circular member so that said jaws register with said annular groove, and manually operable means to move all of said jaws into engagement in said groove.

5. In a trailer hitch assembly, a circular member attached to the frame of an automobile, a shift plate mounted for reciprocal movement in said circular member, a jaw rigidly mounted for movement with said shift plate, jaws slidably mounted in said circular member and operable by cams formed on said shift plate, an inverted dish-shaped trailer plate having an internal annular groove and adapted to be fitted over said circular member so that said jaws register with said annular groove, manually operable means to move all of said jaws into engagement in said groove, and means to secure said circular member and plate against relative axial movement when the jaws are in position in said annular groove.

6. In a trailer hitch assembly, a circular member attached to the frame of an automobile, a shift plate mounted for reciprocal movement in said circular member, a jaw rigidly mounted for movement with said shift plate, jaws slidably mounted in said circular member and operable by cams formed on said shift plate, an inverted dish-shaped trailer plate having an internal annular groove and adapted to be fitted over said circular member so that said jaws register with said annular groove, manually operable means to move all of said jaws into engagement in said groove, means to secure said circular member and plate against relative axial movement when the jaws are in position in said annular groove, and resilient means to urge said shift plate to the jaw engaging position.

OTIS A. LOGAN.

REFERENCES CITED

The following references are of record in the file of this patent:

UNITED STATES PATENTS

| Number | Name | Date |
| --- | --- | --- |
| 1,098,281 | Mayer | May 26, 1914 |
| 1,397,688 | Keelser et al. | Nov. 22, 1921 |